United States Patent [19]

Backstrand

[11] Patent Number: 5,210,473
[45] Date of Patent: May 11, 1993

[54] SYSTEM WITH DELAY TIMER FOR MOTOR LOAD EQUALIZATION

[75] Inventor: Jon E. Backstrand, Oak Creek, Wis.

[73] Assignee: Harnischfeger Corporation, Milwaukee, Wis.

[21] Appl. No.: 794,196

[22] Filed: Nov. 19, 1991

[51] Int. Cl.[5] .............................................. H02P 7/00
[52] U.S. Cl. ..................................... 318/99; 318/432; 318/63
[58] Field of Search .................... 318/34, 85, 55, 7, 67, 318/443, 446, 700, 705, 707, 712, 719, 99, 86, 87, 432, 362, 100, 63, 370

[56] References Cited

U.S. PATENT DOCUMENTS

| | | | |
|---|---|---|---|
| 3,845,366 | 10/1974 | Metzler et al. | 318/99 |
| 4,166,238 | 8/1979 | Binner | 318/67 |
| 4,267,493 | 5/1981 | Roof | 318/443 |
| 4,408,281 | 10/1983 | Tack, Jr. et al. | 318/85 |
| 4,658,971 | 4/1987 | Kornely | 318/628 |
| 4,765,456 | 8/1988 | Bower | 318/85 |
| 5,077,508 | 12/1991 | Wycoff et al. | 318/436 |
| 5,086,964 | 2/1992 | Blaser | 318/7 |

Primary Examiner—Jonathan Wysocki
Attorney, Agent, or Firm—Jansson & Shupe, Ltd.

[57] ABSTRACT

The invention is an improvement in an AC adjustable frequency load-moving system of the type having a control circuit providing a motor speed signal and using command ramps to control each of plural AC squirrel cage motors. The invention helps assure substantially equal load sharing by the motors. The improvement includes a dwell circuit which maintains the motor speed reference signal at a synchronizing value at least for a period of time denominated as the dwell time. This permits microprocessors—which may be running asynchronously—to both "read" the same value of motor speed signal even though such value may be read at slightly different instants. Separate inverter units monitor such signal and responsively generate synchronized command ramps to effect load sharing. The invention is suitable for use with a wide variety of plural-motor drive systems and has been found to be particularly suitable for use on crane hoist systems.

16 Claims, 4 Drawing Sheets

SYSTEM WITH DELAY TIMER FOR MOTOR LOAD EQUALIZATION

FIELD OF THE INVENTION

This invention relates generally to motor controllers and, more particularly, to a system for controlling plural AC motors in an adjustable frequency drive system for substantially equal load sharing.

BACKGROUND OF THE INVENTION

Certain "load-moving" drive systems involve two or more electric motors for moving a single load. In some systems, the motors exert forces on the load by some sort of "resilient" connections, e.g., elastic belts or slip clutches. In such a configuration, each motor (and the power transmission and control equipment connected thereto) is somewhat insulated from mechanical shock resulting from a failure of the motors to share load equally.

On the other hand, some types of systems couple plural motors to a load using "rigid" connections such as gear boxes, line shafts or the like. In those instances, failure of motors to substantially equally share the load can result in undue stress to all of the mechanical components in the drive train (including the motors themselves) and to the electrical control system. Premature wear and breakage is often the result.

An example of an application involving plural drive motors for moving a single load is a crane. Cranes are made in a wide variety of configurations. One type is called an overhead travelling crane (OTC) and is used in factories or the like for lifting and placing loads on the factory floor. Such a crane travels on a pair of elevated main rails which are parallel and spaced apart, usually by several yards. A pair of bridge girders spans across the rails and there are driven wheels mounted at either end of the girders for riding atop the rails. And the girders themselves have rails on them.

A "trolley" is mounted on the girder rails and can travel the width of the bridge under motive power. A load hoist is mounted on the trolley and includes a powered hoist/lower "rope drum" about which steel cable is wrapped. The cable is connected to a load-lifting hook, sling, magnet or the like. With the foregoing arrangement, the operator (who usually rides in a cab attached to the crane) can pick up, move and deposit a load anywhere in the area travelled by the crane.

Another type of crane is called a straddle crane and many of its operating principles are similar to those of an OTC. A difference is that the main rails are about at ground level and the trolley is supported at an elevation by legs extending down from the bridge girders to the main rails. A straddle crane resembles an inverted letter "U" in shape. An advantage of such an arrangement is that the main rails need not be mounted at an elevated level. Another is that the crane can position itself over (or "straddle") a truck, for example, and unload the truck's cargo. Sometimes the crane is an L-shaped "hybrid" with one end supported on an elevated rail and the other on a rail at ground level.

In load-moving systems of the foregoing types (including load hoisting/lowering cranes), controllability of load "picking" and placement is important. That is, the system operator must have the ability to gently initiate load movement and later place the load accurately and gently. Nowhere is this more true than in crane material handling work where the load to be lifted and placed can be an expensive machined product worth thousands of dollars. Such cranes are sometimes designed to lift tons, even hundreds of tons, of load. And, often, crane operations are attended by workers at ground level who assist in load attachment, placement and detachment. Such workers are understandably intolerant of a hoist/lower system which is difficult to control accurately. In plural-motor systems, good control and maximum load lifting capability depend in part upon equalized motor load sharing.

In former years, cranes of the foregoing type were often powered by direct current (DC) electric motors. More recently, alternating current (AC) drive systems have come into wide usage due in significant part to the fact that they can derive power from the existing AC power distribution networks.

A type of variable speed AC drive system used on cranes includes squirrel cage AC motors (generally acknowledged to be the most straightforward of all AC motor types) and controllers for providing variable motor speed ranging from "creep" to rated speed. While such drives are often known as adjustable frequency drives, in fact the power applied by the control system to the AC motor(s) is adjustable both in frequency and in voltage. The frequency of the applied voltage (which ranges generally from zero to 60 Hz for a 60 Hz network as in the United States) controls motor speed while the magnitude of the applied voltage controls motor current and therefore motor output torque. A known way of coordinating frequency and voltage is generally to cause a predetermined change in voltage with each, say, one Hz change in frequency. At very low frequencies, the voltage is elevated slightly to compensate for motor current/resistive losses, often called "IR losses." Some years ago, the term "Hertz," abbreviated "Hz," replaced the phrase "cycles per second" and is synonymous therewith.

A known AC adjustable frequency drive system, useful on cranes, includes a controller for two motors mechanically coupled to the same hoist drum by gearboxes. Such controller has a pair of general purpose, microprocessor-based adjustable frequency inverters (sometimes called scalar inverters), one for each motor. Each inverter derives input power from the AC network at, e.g., 460 volts, 3 phase, 60 Hz. Output power from the inverter to the connected motor is adjustable in frequency and voltage as described above.

A single master switch "tells" the system what motor speed is desired by the operator controlling such switch. It does so by providing a variable AC reference voltage nominally in the range of 0-16v. The master switch handle is movable in an arc either side of a center "neutral" position and the degree of handle displacement from the neutral position determines the magnitude of such voltage.

This voltage is directed to an interface card which rectifies it and responsively provides a DC motor speed signal nominally in the range of 0-10v. As the microprocessors of each inverter scan their programmed instructions, they periodically "read" this motor speed signal and responsively cause the inverters to apply electrical power to the motors at a frequency (and voltage) which correlates therewith. So-called "command ramps" are used to control the inverters in that way.

A command ramp is provided by the microprocessors according to aspects of the programming embedded therein. Such ramp, in the nature of an electrical signal, derives its name from the fact that it causes applied motor voltage to change somewhat gradually rather than instantaneously. One occasion in which such ramps affect system operation is when the operator rapidly throws the master switch handle "hard over" from neutral to an extreme position. Even though such position signifies full motor speed, the system prevents instantaneous application of full voltage. Rather, the applied motor voltage is "ramped up" to the value represented by the final master switch position. Such a system is sometimes said to provide "soft" acceleration and abuse to the electrical and mechanical components is thereby substantially reduced. A motor control system of the foregoing type is made by Harnischfeger Corporation of Milwaukee, Wisconsin, and sold under its SMARTORQUE ® trademark.

With the foregoing arrangement, it is anticipated that the same voltage at the same frequency would be applied to both motors. The output torque of each motor is a function of motor electrical current, in turn a function of applied frequency and voltage. Therefore, electrical current is an indication of the degree to which the motors would share load. With equal motor currents, load sharing would be substantially equal.

Notwithstanding that both inverters are detecting the same motor speed signal, it has been observed that motor currents were not always equal to one another and the proportions of the total load being handled by each motor were sometimes disparate and varied randomly by as much as 1.5:1 or more. As a result, the crane is not able to easily lift rated load, one motor is somewhat "dragged along" by the other and both the electrical and mechanical systems were abused.

One solution to such a problem is to use special purpose inverters, the cost of which is significantly greater than that of a general purpose inverter. Another solution is to provide a feedback circuit whereby motor currents (or speeds or other parameters) are "fed back" for comparison with, say, the DC motor speed signal. Since such speed signal represents the desired motor operating condition, comparing it with a signal representing an actual motor operating condition yields (or may yield) an "error" signal. A feedback system is arranged to automatically change the actual operating condition until it satisfactorily matches that desired.

Such feedback systems are significantly more complex than similar non-feedback systems. As such, they are more expensive in the first instance, are more difficult to troubleshoot and somewhat more prone to failure.

A system which is inexpensive, easy to install or retrofit to existing controllers, uses general purpose inverters and is highly effective in causing load sharing in AC adjustable frequency drives would be an important advance in the art.

OBJECTS OF THE INVENTION

It is an object of the invention to provide an improved load-moving system overcoming some of the problems and shortcomings of the prior art.

Another object of the invention is to provide an improved load-moving system for substantially equal load sharing in AC adjustable frequency drives having plural motors.

Yet another object of the invention is to provide an improved load-moving system using general purpose inverters.

Still another object of the invention is to provide an improved load-moving system which is easy to troubleshoot.

Another object of the invention is to provide an improved load-moving system which is easy to install or to retrofit to existing control systems. How these and other objects are accomplished will become apparent from the following detailed description taken in conjunction with the drawing.

SUMMARY OF THE INVENTION

The invention is an improvement in a load-moving system—a crane, towing winch or the like—of the type having a control circuit providing a motor speed signal. In general, the motor speed signal is a function of the position of the system operator's master switch.

Such circuit uses command ramps to control each of two AC motors arranged to move the load. Such signal like command ramps cause controlled, somewhat gradual motor acceleration rather than equipment-abusive instant full speed starts. A typical application for the invention is a crane having an adjustable frequency drive system connected to two motors for load hoisting and lowering.

The improvement includes a dwell circuit which maintains the motor speed signal at a synchronizing value for at least a dwell time. Two separate motor-connected inverters monitor the signal (including when such signal is maintained at a synchronizing value) and responsively generate command ramps for motor speed control.

Each inverter includes microprocessor means which repetitively scans a sequence of program instructions and periodically "reads" the motor speed signal. The dwell time is at least equal to the time required for a single scan of the instructions and, preferably, to the time required for multiple scans. In that way, each microprocessor means reads the same value of motor speed signal, maintained at the synchronizing value, even though the microprocessor means may initiate scanning at different instants or scan at different rates and therefore, read the motor speed signal at slightly different instants.

The duration of the dwell time depends in part upon the configuration of the system on which the invention is used. If the system includes a brake which sets to hold the load when the motors are de-energized, the dwell time is at least as long as the time required to release the brake and, preferably, is at least equal to the sum of such brake release time and the time required to accelerate the motors to the relatively low speed corresponding to the synchronizing value.

The motor speed signal is a voltage within a range bounded by maximum and minimum values. The synchronizing value of the speed signal is preferably no greater than about 10% of the difference between these maximum and minimum values.

For an application such as crane handling an asymmetrical load (a load requiring more power to move in one direction than in the other) the dwell circuit includes a timer. Its contacts open after the lapse of the dwell time to disable the dwell circuit. In developing the invention, it was discovered that when the system is used on a hoist/lower crane, the motors shared load relatively well in the lowering direction without the invention. Therefore, in one preferred embodiment, the timer is actuated only when the operator's master switch is moved to the hoist position. The entire dwell circuit is disabled during load lowering.

Additional aspects of the invention are set forth in the following detailed description taken in conjunction with the drawing.

DETAILED DESCRIPTION OF PREFERRED EMBODIMENTS

Figure 1:
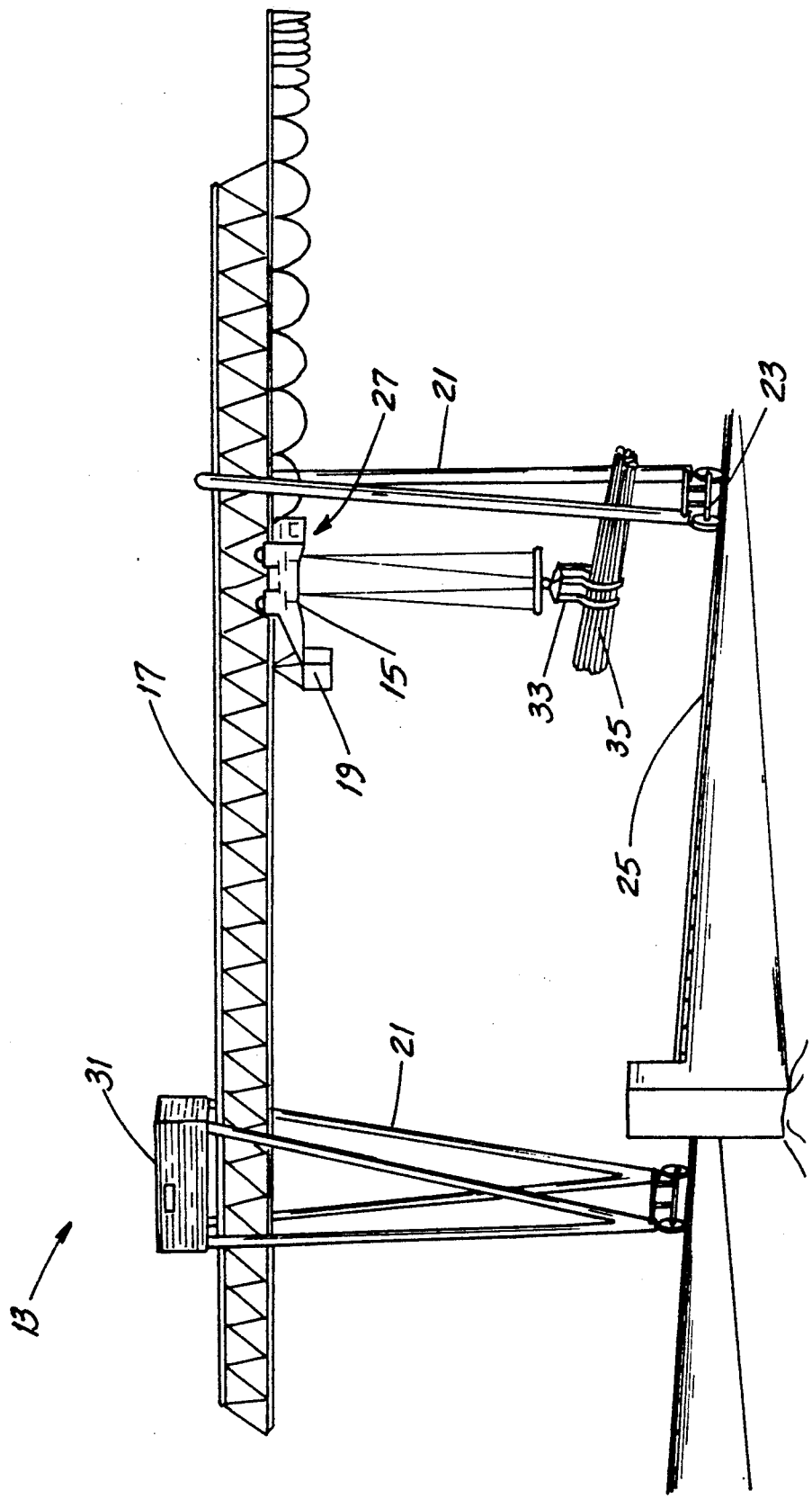
FIG. 1 is a perspective view of an exemplary portal crane, a form of straddle crane, typifying the type of application on which the invention is used.
Figure 2:
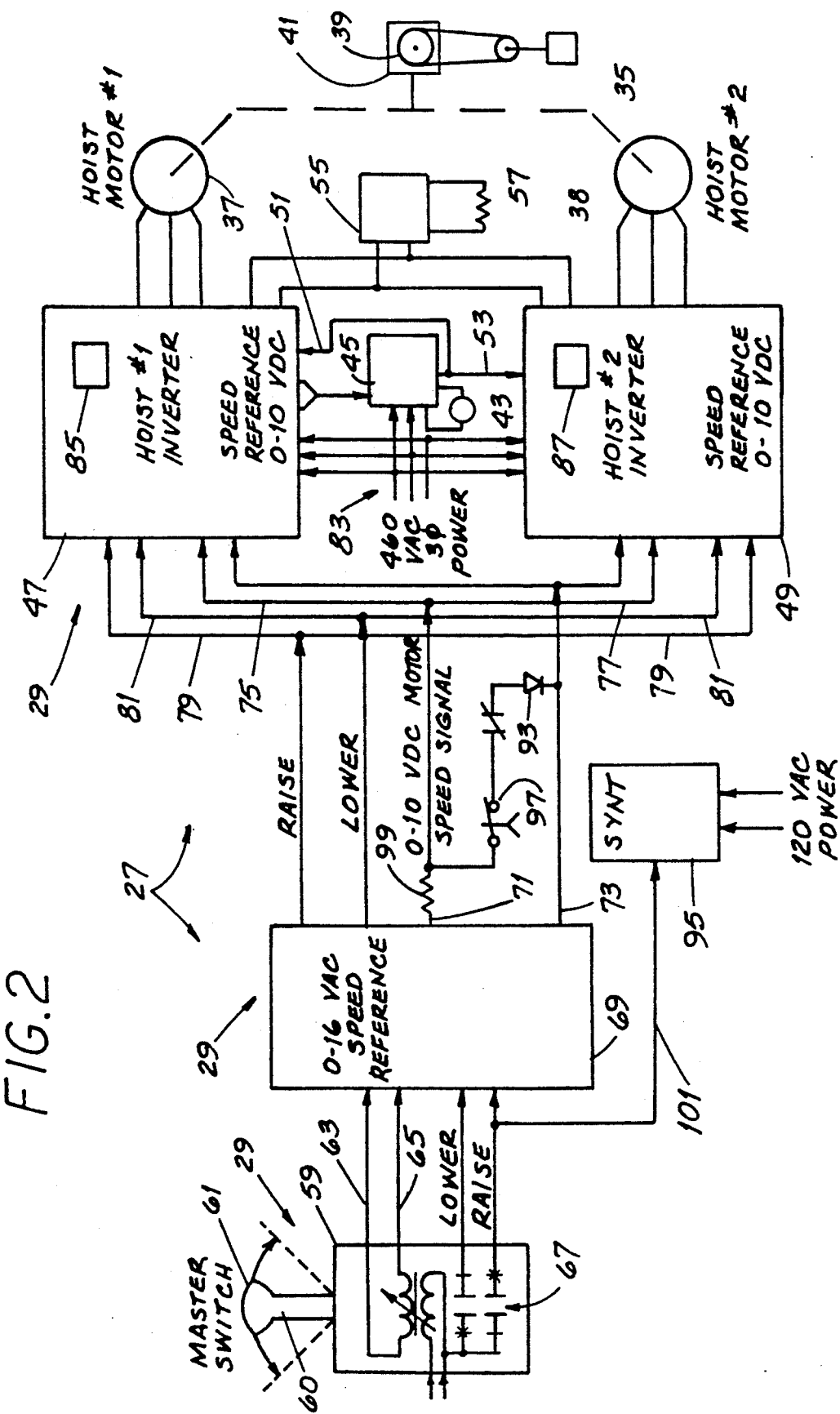
FIG. 2 is a block schematic diagram of a known load-moving system shown in conjunction with the inventive improvement.

Referring first to FIGS. 1 and 2 and before getting into the details of the invention, some background information will be helpful. The crane 13 depicted in FIGURE i is known as a portal crane and has a trolley 15 travelling the length of a bridge 17. The operator's cab 19 is mounted on and travels with the trolley 15. The bridge 17 is supported on stilt-like beams 21, the lower ends of which are mounted on wheeled trucks 23 riding on railroad-like rails 25. The entire crane 13 can traverse the length of a working area and the trolley 15 can traverse its width, both for moving loads into, out of or about the area.

The load moving system 27 includes controls 29 protected within a control house 31. The illustrated crane 13 has a grapple 33 for lifting and lowering loads 35 (such as logs) and its hoist/lower system 27 is driven by two AC squirrel cage motors 37, 38.

A crane hoist/lower system 27 is said to handle asymmetrical loads. That is, considerably more power is required to move the load 35 in one direction (up) than in the other (down). In fact, a lowering load 35 on a crane 13 is regenerative—it can convert kinetic energy (as with a suspended load 35) into electrical power. In contrast, a crane bridge or trolley drive is symmetrical; that is, about equal power is required to move it in either direction. For symmetrical loads 35, it is preferred that the invention be used for both directions of movement. And the invention is not limited to bidirectional adjustable speed drive systems 27. It is equally applicable to unidirectional systems 27 employing plural motors 37, 38 for load moving.

Referring particularly to FIG. 2, the load-moving system 27 is depicted and described as being installed on a crane 13. A load 35 is lifted or lowered by a rope drum 39 powered by a pair of AC squirrel cage motors 37, 38 coupled to speed-reducing, torque-increasing gearboxes 41. From the foregoing, it is apparent that the drive shafts of both motors 37, 38 are mechanically "tied together."

The crane 13 also includes one or two spring-set, magnetically released shoe brakes 43 installed in a known manner. Even with a load 35 on the crane 13, such brakes 43 prevent the motors 37, 38 (and therefore the drum 39) from turning when the system 27 is shut down. When initiating hoisting or lowering operations, the brake(s) 43 are released by a brake control 45 and when the brake(s) 43 open, such fact is simultaneously signalled to inverters 47, 49 along the signal lines 51 and 53.

Of course, a suspended load 35 will tend to lower of its own weight. In other words, no load driving torque is needed from the motors 37, 38. Rather, the motors 37, 38 are controlled to retard the load 35 so it does not "run away." An aspect of the system 27 used for load retardation during lowering includes dynamic braking units 55 with resistors 57 for dissipating such energy as heat. Those aspects of the system 27 more relevant to the invention will now be described.

The system 27 includes an operator-manipulated hoist/lower master switch 59 of the induction type. The switch handle 60 has an illustrated neutral position 61 (wherein the motors 37, 38 are off) and can be moved left or right of center for hoisting or lowering loads 35. Conventionally, such master switches are mounted with respect to the operator's position in the cab 19 so that pulling the handle 60 toward the operator raises the load 35 and pushing it away lowers the load 35. Irrespective of the direction of handle travel, the switch 59 provides an AC reference signal nominally in the range of 0–16v. Such signal is provided at line 63, is measured with respect to line 65 and is generally proportional to the magnitude of handle movement. That is, the farther the handle 60 is moved from center, the greater the value of such AC signal. Whether such signal is used to control motor speed in the hoist or in the lower direction is determined by mechanically actuated contacts 67 on the master switch 56.

Such signal is directed to an interface card 69 providing a motor speed signal at line 71 and having a value nominally in the range of 0–10v.DC as measured with respect to the line 73. The value of the motor speed signal is a function of the value of the AC reference signal from the switch 59 and, in general, is proportional thereto. In practice, the interface card 69 is configured so that the minimum value of the motor speed signal available at the line 71 is about 0.5v. or so. Sometimes this is referred to as the "first point" value, an allusion to the signal value at the lowest speed control position of the switch 59.

It is to be appreciated that the same motor speed signal is directed to each inverter 47, 49 along the lines 75 and 77, respectively. The card 69 also provides an "instructive" signal along the line 79 or the line 81 to the inverters 47, 49 to raise or lower the load 35, respectively.

The system 27 also includes first and second inverters 47 and 49, respectively. Such inverters 47, 49 are of the general purpose type and are connected in parallel in the controls 29 and in the AC power network 83. Each inverter 47, 49 is electrically coupled to a corresponding motor 37 and 38, respectively, and provides controlled, adjustable power to such motors 37, 38.

Inverters 47, 49 of the general purpose type are not speed regulated. That is, they are devoid of feedback signals or flux vector control. Virtually all inverters, including those of the general purpose type, have current-sensing internal feedback loops. Such loops do not provide speed regulation.

Each inverter 47, 49 includes microprocessor means 85, 87, respectively, (one or more microprocessors) which repetitively runs through its program embedded therein and scans a sequence of program instructions.

Aspects of such instructions cause scanning of all logic on/off inputs (such as whether to raise or lower the load 35 and whether or not the brake control 45 has signalled brake release.) Other aspects cause the means 85, 87 to scan and "read" the value of the motor speed signal. Such scanning occurs once for each program "run," nominally about every 20 milliseconds.

As explained above, movement of the handle 60 causes a corresponding AC reference signal and, as a result, a DC motor speed signal. Since the master switch handle 60 may be moved rapidly and/or there may be slight delays in propagation of the reference signal, the microprocessor means 85, 87 also scans and updates the motor speed signal itself but at a much more rapid rate. Such scanning and updating helps assure that the value of the motor speed signal "read" by the microprocessor means 85, 87 and used for speed control is substantially identical to that on the lines 75 and 77.

It is to be appreciated that the microprocessor means 85, 87 uses the motor speed signal to initiate command ramps controlling each motor 37, 38. The preceding "Background" section mentions random variances in motor currents. After considerable analysis, it was decided that a possible reason for such random variances was that as improbable as it seemed, the microprocessor means 85 of a particular inverter, e.g., inverter 47, was "reading" a motor speed signal different from that read by the other inverter 49. Further analysis suggested (without verification) the reason therefor, i.e., that as each means 85, 87 repetitively ran its program, they did not necessarily do so starting at the same instant. And if program runs started at different instants, the microprocessor means 85, 87 "read" the value of the motor speed signal at different instants.

Figure 3:
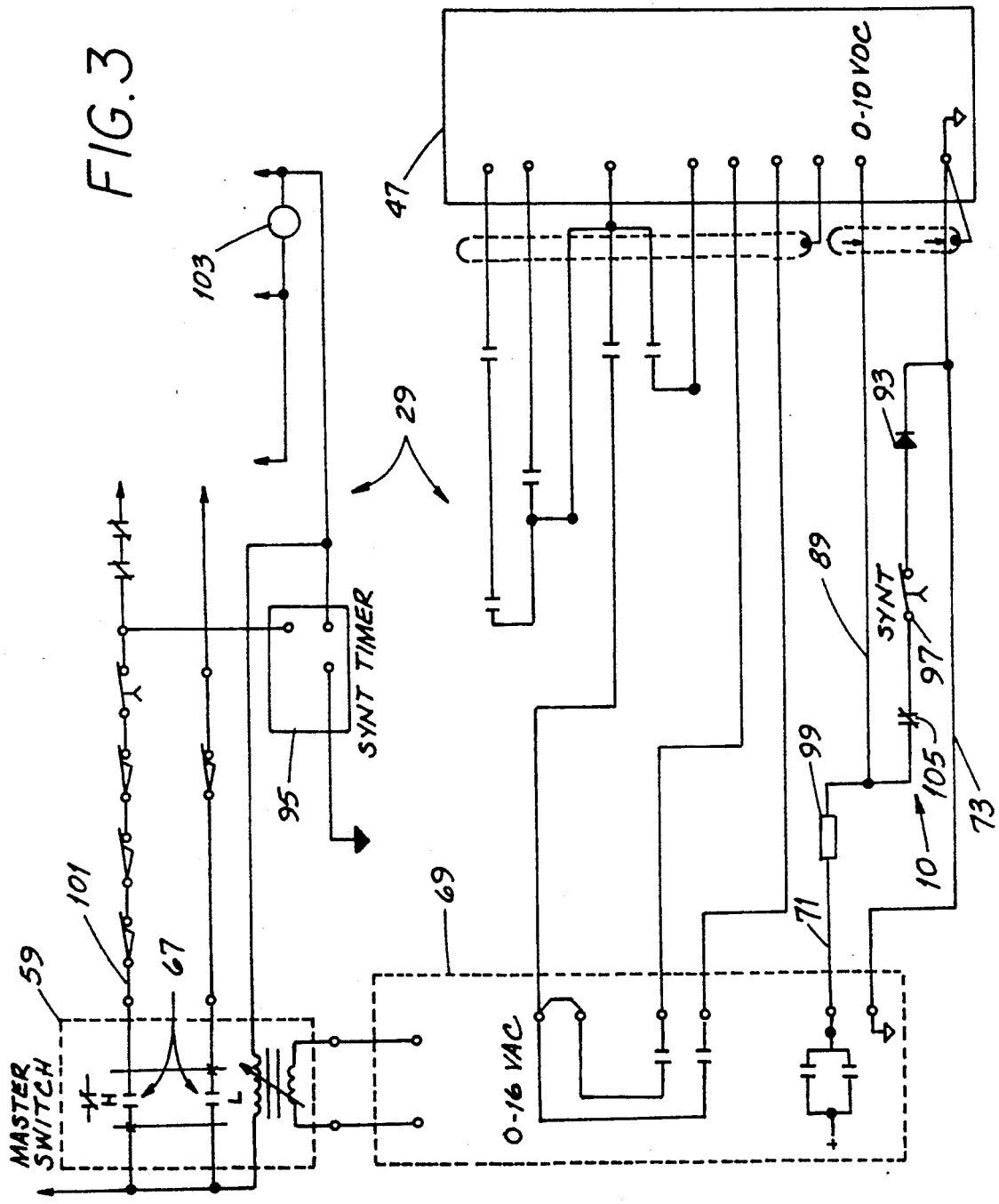
FIG. 3 is a circuit diagram, with parts in dashed outline, of a portion of the control circuit used in the system of FIG. 2. Such circuit diagram is shown in conjunction with the inventive improvement.

Referring additionally to FIG. 3, the inventive improvements includes a dwell or delay circuit 10 maintaining the motor speed signal at a relatively low voltage, termed the "synchronizing value," at least for a period of time denominated as the dwell time. It is to be understood that the dwell circuit 10 holds the motor speed signal at a relatively low synchronizing value notwithstanding that the voltage on the line 71 may be rising and well in excess of that corresponding to the synchronizing value.

Such dwell or delay times at least equal to the time required for each microprocessor means 85, 87 to make a single scan of its instructions, e.g., about 20 milliseconds, and preferably for multiples of the "single scan time." In that way the same value of the motor speed signal is read by each microprocessor means 85, 87 even though the instant of each such reading may differ. In a hoist/lower system 27 having a brake 43, the dwell time is at least as long as the time required to release the brake 43, e.g., about 0.6 seconds or so, and preferably is at least as long as the sum of the brake release time and the time required to accelerate the motors 37, 38 to the speed corresponding to substantially equal synchronizing value. Acceleration times vary with load and a time of well less than one second is not unusual. Of course, the above are only exemplary times and could vary widely.

The inverters 47, 49 monitor such motor speed signal, detect its synchronizing value and responsively generate synchronized command ramps. The motors 37, 38 are thereby caused to run at substantially equal speed and share load substantially equally.

Preferably, the synchronizing value is no greater than about 10% of the difference between the maximum and minimum voltages identifying the range of possible motor speed signal values. In the illustrated embodiment, the synchronizing value is not greater than about one volt (10% of 0–10v.DC) and, most preferably, is about 0.6v.DC, i.e., about equal to the first point value of 0.5v.DC.

The system controls 29 includes a speed signal bus 89 and the dwell circuit 10 maintains the speed signal at a synchronizing value by "clamping" or holding the speed signal bus 89 at a synchronizing low voltage with respect to a reference bus 73. Clampling is by coupling a diode 93 between the buses 73, 89.

The dwell circuit 10 also includes a timer 95, preferably of the solid state, hermetically sealed type. The timer 95 has contacts 97 in series with the diode 93 so that the dwell circuit is disabled after lapse of the dwell time. It is to be understood that the dwell time is described in the exemplary embodiment as being at least that necessary for one or more events to occur; such time is set on the timer 95 for dwell circuit disabling.

From an inspection of FIG. 2 or FIG. 3, it will be appreciated that with the contacts 97 closed, the line 89 would be short circuited to the line 73 but for the diode 93 which exhibits low resistance. Therefore, a highly preferred dwell circuit 10 includes a resistor 99 limiting current flowing from the line 71 on the interface card 69.

Referring to FIG. 3, the timer 95 is energized by the master switch 60 along line 101 to initiate the timing function. While timer energization could be for either direction of load movement, it has been discovered that in a crane hoist/lower system, the motors 37, 38 share load relatively equally when the load 35 is being lowered. Therefore, the timer 95 is energized only when the master switch 60 is moved to the hoist position and the upper contact 67 closes. The system 27 includes a relay 103 opening contacts 105 in the dwell circuit 10 during load lowering for disabling such circuit 10.

For ease of understanding, FIG. 3 shows only one inverter 47. The second inverter 49 is coupled in parallel therewith.

Figure 4:
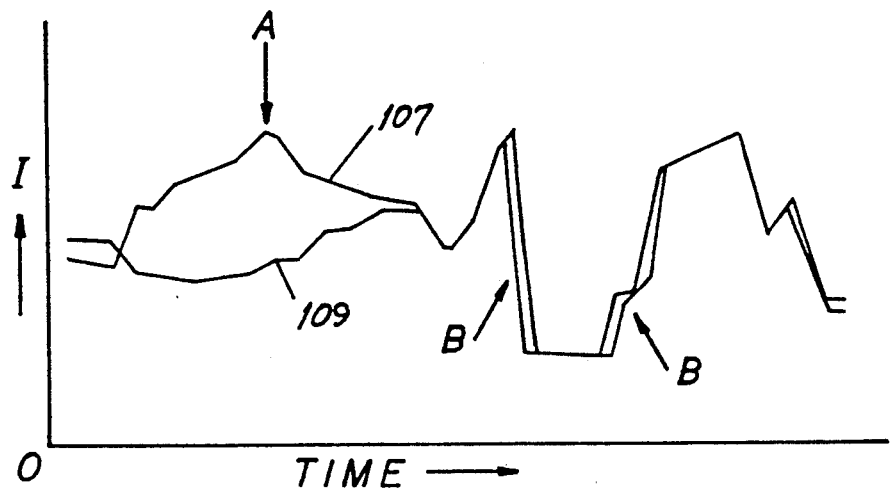
FIG. 4 is a plot of the waveforms of motors operating in a system which does not include the invention.
Figure 5:
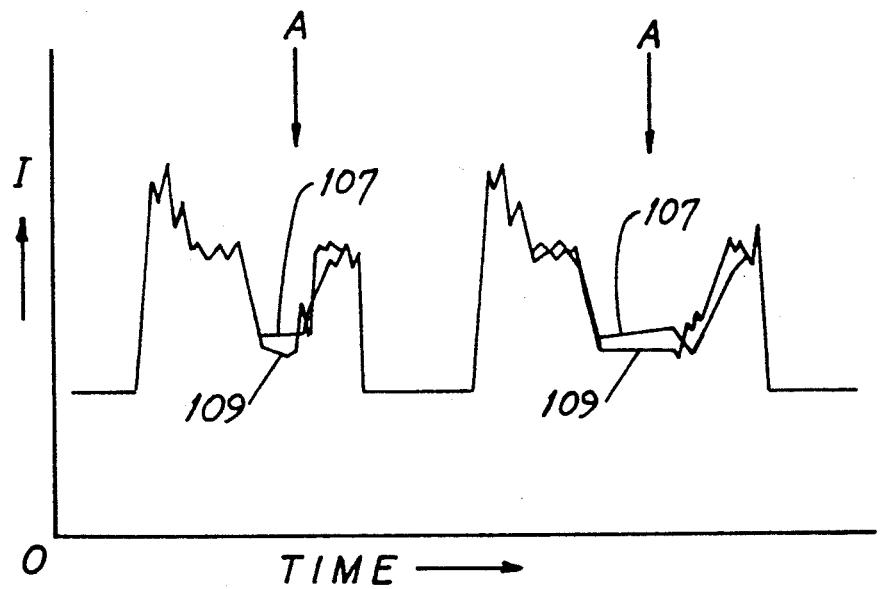
FIG. 5 is a plot of the waveforms of motors operating in a system which includes the invention.

A comparison of FIGS. 4 and 5 helps illustrate the effectiveness of the invention. Each such FIGURE is a "plot" of the waveform 107, 109 of motor current (represented by "1") such as for motors 37, 38, respectively. FIG. 4 shows motor current in load-moving (specifically, hoisting) without using the invention. In region "A," the current represented by waveform 107 is about 65% greater than that represented by waveform 109—this represents a very serious load-sharing imbalance. And in regions "B," the motor currents have "time-shifted" slightly.

FIG. 5 shows waveforms 107, 109 of motor current when the system 27 includes the invention. Note that load-sharing imbalance is limited to a maximum of about 10% as shown in regions "A" and for the most part, motor load sharing is nominally equal as represented by the coincidence of waveforms 107, 109 over most portions of the depictions. Of course, the waveforms 107, 109 represent an actual system 27 and results may differ somewhat in systems of other configurations.

It is to be understood that once the teachings set forth herein are appreciated, one may recognize other ways in which to maintain the motor speed signal at a synchronizing value for a time. The described circuit 10 is suitable for original and retrofit applications and has proven effective. It should also be understood that while the principles of the invention have been described with respect to specific embodiments, such embodiments are exemplary and the invention is not intended to be limited thereby.

I claim:

1. An improved system for equalizing motor load in an open loop open loop plural-motor drive of the type having a master switch for starting and imposing load on all motors simultaneously, a control circuit providing a motor speed signal and using command ramps to control each of plural AC motors, the improvement comprising:

delay circuit maintaining such signal at a voltage value for at least a delay time;

a separate inverter unit coupled to each motor, monitoring such signal and responsively generating synchronized command ramps, whereby substantially equal motor speeds are maintained and the motors thereby share load substantially equally.

2. The system of claim 1 wherein each inverter includes microprocessor means repetitively scanning a sequence of program instructions and the delay time is at least equal to the time required for a single scanning of such instructions.

3. The system of claim 2 wherein the system further includes a brake which sets to hold the load when the motors are de-energized which is released during load motion and the delay time is at least as long as the time required to release the brake.

4. The system of claim 1 including a brake and the delay time is at least equal to the sum of the time required to release the brake and the time required to accelerate the motors to the speed corresponding to the voltage value.

5. The system of claim 1 wherein the motor speed signal is a voltage within a range bounded by maximum and minimum voltages and the voltage value is no greater than about 10% of the difference between the maximum and minimum voltages.

6. The system of claim 5 wherein the voltage value is not greater than about one volt.

7. The system of claim 5 wherein the system includes a switch controlling motor speed, such switch causes a motor speed signal at its first point of movement away from neutral and the voltage value is about equal to the first point value.

8. The system of claim 1 wherein the control circuit includes a speed signal bus and the delay circuit maintains the speed signal at a voltage value by clamping the speed signal bus at a synchronizing voltage.

9. The system of claim 8 wherein the control circuit further includes a reference bus and the synchronizing voltage is with respect to such reference bus.

10. The system of claim 9 wherein the speed signal bus is clamped by coupling a diode between the buses.

11. The system of claim 10 wherein the delay circuit further includes a timer having contacts in series with the diode whereby such delay circuit is disabled after lapse of the delay time.

12. The system of claim 11 wherein the motor speed signal is provided at a terminal on an interface card and the delay circuit further includes a resistor limiting current flowing from such terminal when the timer contacts are closed.

13. The system of claim 1 wherein the system includes a master switch and the delay circuit includes a timer actuated by the master switch.

14. The system of claim 13 wherein the system is used on a crane to hoist and lower loads and the timer is actuated when the master switch is moved to the hoist position.

15. The system of claim 14 wherein the timer is actuated only when the master switch is moved to the hoist position.

16. The system of claim 13 including a relay opening contacts in the delay circuit during load lowering, thereby disabling the delay circuit.

* * * * *